United States Patent
Kramer et al.

(10) Patent No.: US 10,540,259 B1
(45) Date of Patent: Jan. 21, 2020

(54) MICROSERVICE REPLAY DEBUGGER

(71) Applicant: Amazon Technologies, Inc., Seattle, WA (US)

(72) Inventors: Reto Kramer, Sammamish, WA (US); Anssi Alaranta, Seattle, WA (US); Jeffrey Hoffman, Sammamish, WA (US); Abhishek Singh, Seattle, WA (US); David Nunnerley, Bainbridge, WA (US)

(73) Assignee: Amazon Technologies, Inc., Seattle, WA (US)

( * ) Notice: Subject to any disclaimer, the term of this patent is extended or adjusted under 35 U.S.C. 154(b) by 152 days.

(21) Appl. No.: 15/675,580

(22) Filed: Aug. 11, 2017

(51) Int. Cl.
*G06F 11/36* (2006.01)

(52) U.S. Cl.
CPC ...... *G06F 11/3636* (2013.01); *G06F 11/3664* (2013.01)

(58) Field of Classification Search
CPC .......... G06F 11/3636; G06F 11/3664
USPC ............. 714/38.1, 38.14, 45; 717/124, 128
See application file for complete search history.

(56) References Cited

U.S. PATENT DOCUMENTS

| | | | |
|---|---|---|---|
| 8,380,665 B2 * | 2/2013 | Papadomanolakis | G06F 11/3688 707/610 |
| 9,588,870 B2 * | 3/2017 | Marron | G06F 11/362 |
| 9,632,914 B2 * | 4/2017 | Cheng | G06F 11/3644 |
| 9,934,126 B1 * | 4/2018 | Mola | G06F 16/328 |
| 10,210,073 B1 * | 2/2019 | Baruch | G06F 11/3664 |
| 2018/0203786 A1 * | 7/2018 | Marron | G06F 11/3664 |

OTHER PUBLICATIONS

"Elm's Time Traveling Debugger", http://debug.elm-lang.org/, open source 2014, retrieved on Jul. 17, 2017, 4 pages.
Chandra, R. et al., "Asynchronous Intrusion Recovery for Interconnected Web Services", SOSP'13, Nov. 3-6, 2013, Farmington, Pennsylvania, USA, ACM 978-1-4503-2388-Aug. 31, 2011, http://dx.doi.org/10.1145/2517349.2522725, 15 pages.
Kim, T. et al. "Recovering from Intrusions in Distributed Systems with DARE", APSys' 12, Jul. 23-24, 2012, Seoul S. Korea, Copyright 2012, ACM 978-1-4503-1669-Sep. 12, 2007, 7 pages.
Chandra, R. et al. "Intrusion Recovery for Database-Backed Web Applications", SOSP' 11, Oct. 23-26, 2011, Cascais, Portugal, Copyright 2011, ACM 978-1-4503-0977-Jun. 11, 2010, 14 pages.

* cited by examiner

*Primary Examiner* — Joseph R Kudirka
(74) *Attorney, Agent, or Firm* — Lowenstein Sandler LLP

(57) ABSTRACT

A debugger core captures one or more inputs to a distributed application during live execution of the distributed application in a production environment. The debugger core applies the one or more inputs to the distributed application during replay execution of the distributed application in a debugging environment and performs debugging of the distributed application in the debugging environment.

17 Claims, 8 Drawing Sheets

MICROSERVICE REPLAY DEBUGGER

BACKGROUND

A service-oriented architecture is a software design paradigm in which application components provide services to other application components through a communication protocol. By using an abstraction similar to that of object oriented programming, services can be deployed on multiple computing devices and in multiple locations, which allows for scaling and flexibility. Microservices are a particular approach to service-oriented architecture with a small granularity. Under a microservices approach, a single request for a web page might be handled by dozens of different services that are each specialized to perform a specific task.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1:
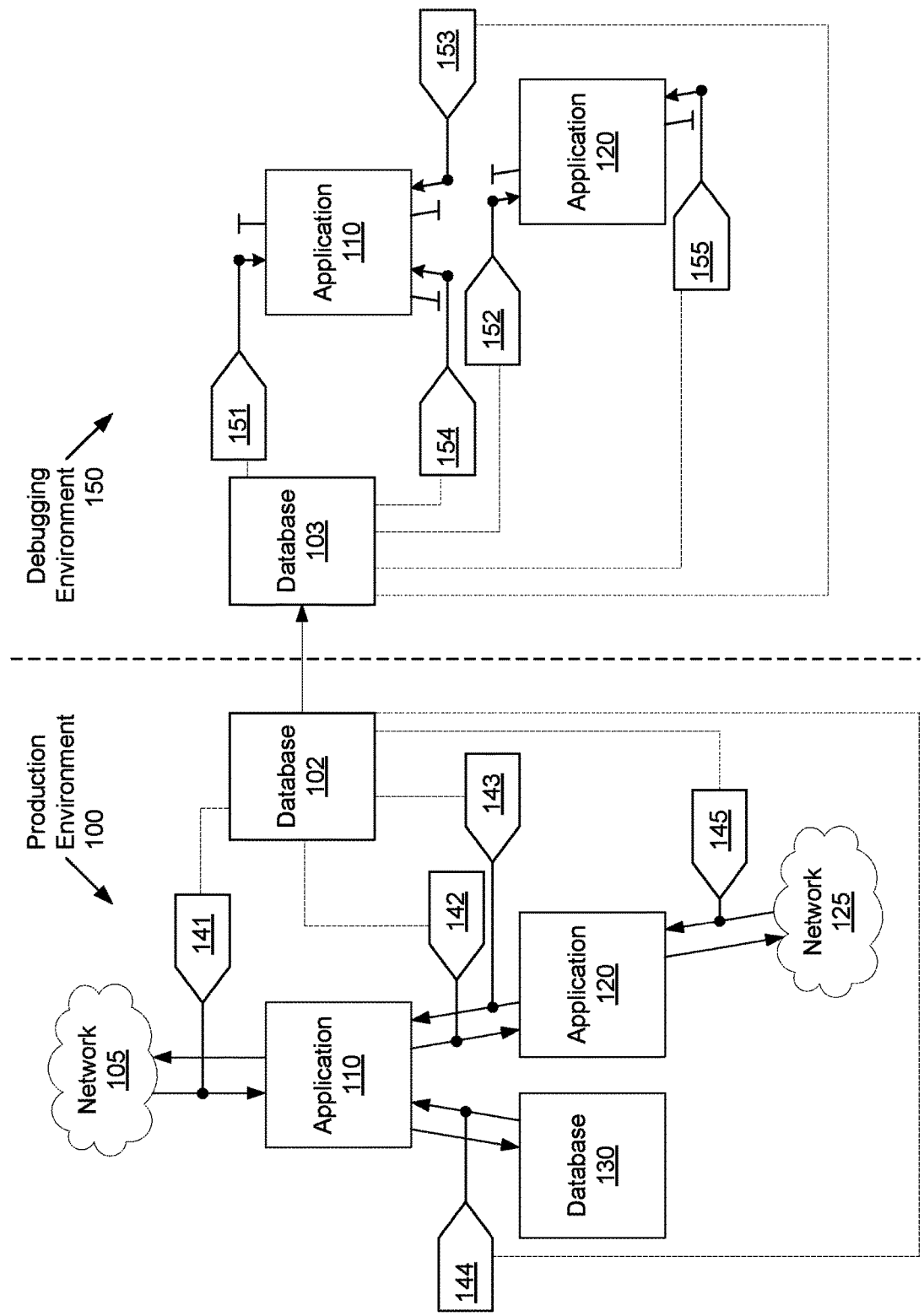
FIG. 1 is a block diagram illustrating microservice replay debugging, according to an embodiment.

Embodiments are described for a microservice replay debugger. Service-oriented architectures, and particularly those involving microservices, can be extremely difficult to debug. As a single request to generate a web page may result in dozens of different microservice calls, a failure or software defect in any one of the microservices may result in a failure or error in generating the web page. For example, a customer request to add an item to an electronic shopping cart may result in a call to a first service to identify the customer, a call to a second service to verify the price of the item, a call to a third service to verify a shipping address, a call to a fourth service to confirm warehouse availability of the item, and so forth. Any of these dependent services may exhibit defects or may not be operating properly.

In searching out software defects or performing an operational assessment, code traces are often helpful. For instance, code traces can assist in identifying performance bottlenecks, edge case errors, and other hard-to-detect issues. A code trace can identify which services are invoked by a particular service, along with associated metadata such as parameters, timestamps, results, and so on. With microservices, code traces can become extremely lengthy and complex and tracing itself can introduce a significant resource overhead.

In addition, debugging distributed microservice systems is difficult since there are no built-in facilities to track and understand the interactions among individual services. Unlike traditional desktop application debugging, microservices cannot be paused at a breakpoint for debugging, since customer and database requests would time out. Timeouts that guard all remote calls, and some local calls, would expire and manifest as end-user visible fatal errors. As a result, developers and operators have only debug logs to go by when trying to identify the source of faults or errors.

In one embodiment, the microservice replay debugger described herein rectifies the situation by providing developers and operators with a debugging capability that is based on recording inputs (e.g., values received as the result of system calls) presented to live systems and later replaying these inputs under debugger control in a safe environment, separate from the live production or test setup.

In one embodiment, a debugger core intercepts and records enough data to let customers re-run request handler code in a traditional debugger, outside the live system without subsequently affecting the live system and data. These "replay" executions can happen as soon as all captured data is available, just moments after the actual live request handling completes. The handlers can be re-run in traditional debugging environments (e.g. gdb), allowing users to leverage decades of core technology and use tools with which they are already familiar within their developer workflows.

In one embodiment, for safety, during replay execution, all inputs the request handlers receive come from the previously captured execution data, and all outputs are ignored. Since no system and remote calls happen during the replay debugging, the requests can be replayed in environments and at locations that are different from the live system. For example, customers could even choose to replay requests on their local laptop using their favorite debugger setup, as long as they have access and permissions to the request input log of an associated code trace. In other embodiments, customers need not use their local environments for debugging, since the debugger core supports a fully managed replay and user-interface experience offering single step breakpoints across a distributed application with many handlers.

The replay debugger offers customers the experience of debugging their applications in a way they are used to, but in a sandboxed offline environment that does not interrupt live execution. Customers can choose to re-run requests many days, or even months after the live request was captured. Similarly, the replay debugger can re-run requests in bulk mode to gather statistics about the distribution of local variable values across thousands of requests.

The microservice replay debugger techniques described herein cause minimal service impact in the test and/or production environments since they merely capture service inputs at that stage (similar to what is done for trace data). The replay debugger allows for offline debugging of individual or bulk service requests, which is "safe" in the sense that it cannot affect live execution of the distributed applications. Debugging can optionally happen locally on a laptop or other computer system while providing developers with a well understood desktop debugging like experience that permits single stepping across service boundaries. The replay debugger can be used beyond debugging as building block for other tasks, such as auditing and regression tests and works seamlessly with serverless and container based systems. In addition, the replay debugger leverages tried and trusted core debugging technology (e.g. GDB), works for multiple and mixed operating systems and programming languages, and is able to honor customer network isolation requirements while still offering the above described advantages.

FIG. 1 is a block diagram illustrating microservice replay debugging, according to an embodiment. In one embodiment, one or more distributed applications 110 are executed in a production environment 100. The execution of distributed application 110 in production environment 100 may be termed a "live execution" as application 110 is running actual customer processes. Application 110 can correspond to a customer-owned application that is hosted on underlying hardware in production environment 100. Application 110 may be a web-based application or web service that uses hypertext transfer protocol (HTTP), simple object access protocol (SOAP), representational state transfer (REST), and/or related technologies. Application 110 may be relatively simple or relatively complex, potentially being made up of a plurality of microservices that can be referred to as component services of the respective application. For example, one user service may invoke other user services, other services in the production environment 100, or external services outside of the production environment 100.

In one embodiment, during the live execution of distributed application 110 in production environment 100, a replay debugger may capture one or more inputs to distributed application 110. For example, the replay debugger may capture an input 141 from a network 105 to application 110, an input 142 from application 110 to application 120, an input 143 from application 120 to application 110, an input 144 from database 130 to application 110, or an input 145 from network 125 to application 120. In one embodiment, the replay debugger stores all of the captured inputs 141-145 in a database 102 or other data store. In one embodiment, database 102 is a networked data store which is accessible from the production environment 100.

In one embodiment, the inputs 141-145 may include responses (e.g., values, variables) to calls made to a plurality of component services of the distributed application 110 during execution. For example, an input may include the result of a database query, a cache lookup, status, header and body of an HTTP request, etc. In other embodiments, the replay debugger may further capture an indication of a request or event that triggers the handler code, the success codes of output operations (e.g., error numbers or exceptions, a result of non-deterministic language runtime and operating system calls (e.g., get system time, generate random number), concurrency related sources of non-determinism, all information read from global variables, etc.

To capture these inputs and information, the application 110 need not be run in the debugger. Instead, the customer can run their regular unmodified code in a "capture" mode, which is supported with a combination of runtime (bytecode modification), wrapped libraries, and source code rewrites (transparent in CodeBuild, or hidden as "touchless"). The capture mode can be performant, cheap, and invisible enough for most customers to enable capturing the data most of the time, if not always.

Once captured and stored in database 102, the inputs can be used during a replay execution of the distributed application 110 in debugging environment 150. In one embodiment, the contents of database 102 are copied to a separate database 103 accessible from the debugging environment. Copying the contents of database 102 to database 103 ensures that the contents of database 102 cannot be corrupted during debugging operations. In one embodiment, debugging environment 150 is off-line and completely separate from production environment 100. Upon request from a user, the replay execution of application 110 is initiated in debugging environment 150. At the point in the replay execution where application 110 makes calls to a plurality of component services, the replay debugger responds to those calls with the inputs captured during live execution and stored in database 103. For example, the replay debugger may apply an input 151, 153 or 154 to application 110, or an input 152 or 155 to application 120. These inputs 151-155 include the same data and values captured from inputs 141-145 in the production environment 100. As a result, the replay execution of application 110 in debugging environment 150 will be identical to the live execution of application 110 in production environment 100.

In one embodiment, a user may perform debugging of the distributed application 110 during the replay execution in debugging environment 150. Since the replay execution uses inputs stored in database 103, and does not rely on inputs from other microservices, the debugging can be performed using any debugging tools that use operations, including breakpoint, pause resume. The replay execution of application 110 can be paused and stepped through in the debugging environment without any impact on the live execution in production environment 100. During debugging, the replay debugger can add logging to code-lines in production, without redeploying the application 110, set breakpoints, catch exceptions, and single-step (backwards and forward) through request handler code, inspect and trap ("datapoint" or "watch") local variables across all compute nodes of application 110, see and single-step into remote calls (similar to stepping into a functions, but for remote calls), ask and navigate to requests that ran a specific line of code in a time interval (e.g. last 5 minutes), inspect all input and output data that a request has processed, run statistical analysis of code execution across thousands of requests (e.g. compute the distribution of local variable values, compute code line coverage with detailed link-back to requests/users/client-ip), answer security related questions (e.g., which application end-users executed a given line of code in a specific version of the code in the last 6 months), etc. Since no input/output operations occur during replay execution, the debugging can be performed in any place that has access to the captured data in database 103. In particular, replay execution can be performed in a massively parallel manner in a cloud computing system. Furthermore, since no output operations occur during replay execution, no live data can be altered accidentally.

Figure 2:
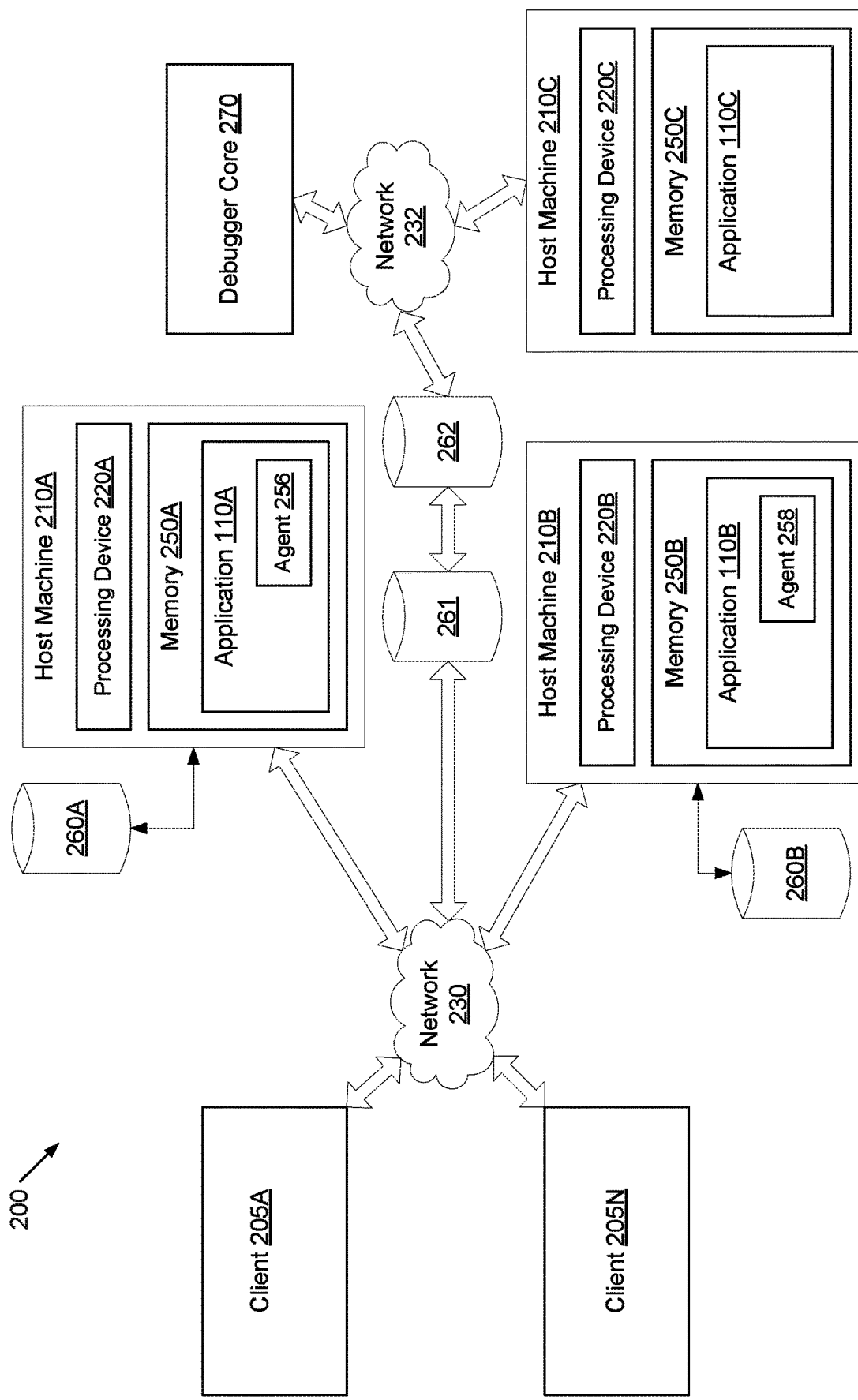
FIG. 2 is a block diagram of an exemplary network architecture, in which embodiments of the present disclosure may operate.

FIG. 2 is a block diagram of an exemplary network architecture 200, in which embodiments of the present disclosure may operate. In one embodiment, the network architecture 200 includes one or more host machines 210A-210C forming a computing cluster, which may be employed to provide cloud computing services to one or more client devices 205A-205N. The client devices 205A-205N may communicate with host machines 210A-210B via one or more networks 230. Client devices 205A-205N are representative of any number of clients which may utilize host machines 210A-210B for storing and accessing data in network architecture 200. Client devices 205A-205N are representative of any number of stationary or mobile computers such as desktop personal computers (PCs), servers, server farms, workstations, laptops, handheld computers, servers, personal digital assistants (PDAs), smart phones, and so forth. It is noted that some systems may include only a single client device, connected directly or remotely, to host machines 210A-210B.

In alternative embodiments, the number and type of client devices, host machines, and data storage devices is not limited to those shown in FIG. 2. At various times one or more clients may operate offline. In addition, during operation, individual client device connection types may change as users connect, disconnect, and reconnect to network architecture 200. Further, the systems and methods described herein may be applied to directly attached computing systems or network attached computing systems and may include a host operating system configured to perform one or more aspects of the described methods. Numerous such alternatives are possible and are contemplated.

In one embodiment, network 230 may utilize a variety of techniques including wireless connections, direct local area network (LAN) connections, wide area network (WAN) connections such as the Internet, a router, storage area network, Ethernet, and others. Network 230 may comprise one or more LANs that may also be wireless. Network 230 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 230. The network 230 may interface with a set of communications protocols used for the Internet such as the Transmission Control Protocol (TCP) and the Internet Protocol (IP), or TCP/IP.

In one embodiment, each host machine 210A-210B may be associated with one or more data storage devices 260A-260B. Examples of data storage devices include solid-state drives (SSDs), flash memory, magnetic or optical disks, tape drives, RAID arrays, EEPROM devices, storage area networks, network-attached storage, and/or any other devices capable of storing data.

Host machines 210A-210C may each include one or more processing devices 220A-220C, each comprising one or more processor cores. Each processor core includes circuitry for executing instructions according to a predefined general-purpose instruction set. The processor cores may access cache memory subsystems for data and computer program instructions. The cache subsystems may be coupled to a memory hierarchy comprising random access memory (RAM) 250A-250C and a storage device 260A-260B. Each of memories 250A-250C may include a corresponding instance of a distributed application 110 (i.e., 110A-110C). Application 110 may correspond to customer-owned applications hosted in the cloud-computing environment. In one embodiment, an agent 256, 258 may reside on each of host machines 210A-210B (e.g., as part of distributed applications 110A-110B). This agent may provide information to a debugger core 270 including captured inputs received by application 110 during live execution. Agents 256, 258 may use a combination of runtime (language and OS level) and source code instrumentation techniques to intercept and capture non-deterministic results that influence live system request handler computations. Depending on the runtime environment and language this can be done more or less transparently for customers.

In one embodiment, network architecture 200 further includes debugger core 270. Debugger core 270 may run on a standalone machine or may be distributed across two or more physical machines, including the standalone machine, host machine 201C and/or other machines. In one embodiment, debugger core 270 can initiate a replay execution of application 110 in a debugging environment, apply the captured inputs from the live execution (which can be stored in attached data store 262) to the replay execution in response to received system calls, and allow for offline debugging. Additional details of debugger core 270 are described below with respect to FIGS. 3-8.

Figure 3:
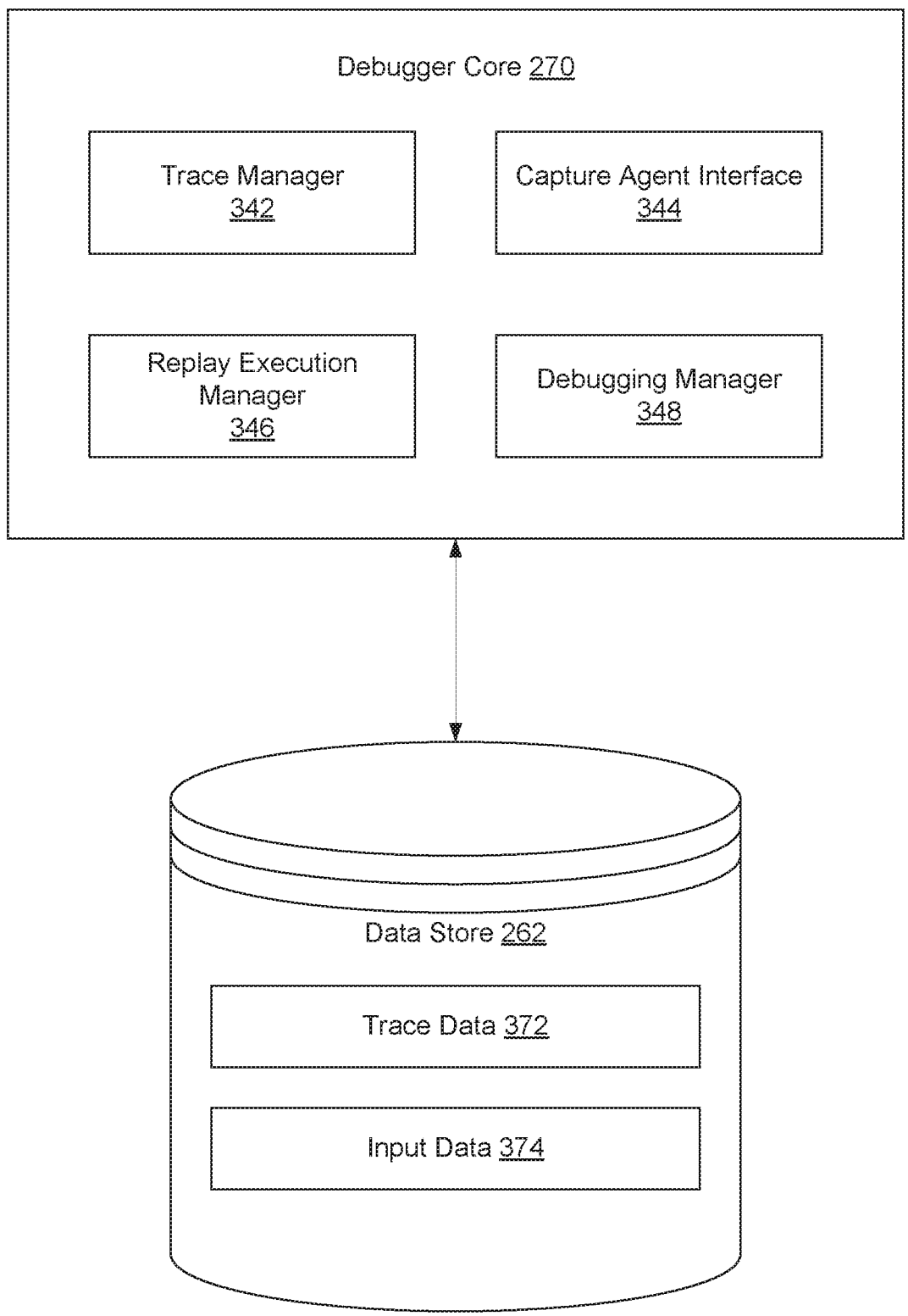
FIG. 3 is a block diagram illustrating a debugger core, according to an embodiment.

FIG. 3 is a block diagram illustrating a debugger core, according to an embodiment. In one embodiment, debugger core 270 includes trace manager 342, capture agent interface 344, replay execution manager 346, and debugging manager 348. This arrangement of modules and components may be a logical separation, and in other embodiments, these modules or other components can be combined together or separated in further components, according to a particular implementation. In one embodiment, data store 262 is connected to debugger core 270 and includes trace data 372 and input data 374. In one implementation, one physical node may include both debugger core 270 and data store 262. In another embodiment, data store 262 may be external to the physical node and may be connected over a network or other connection. In other implementations, the physical node and debugger core 270 may include different and/or additional components and applications which are not shown to simplify the description. Data store 262 may be embodied on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, trace manager 342 provides code trace capturing and analysis for application 110 and user services hosted in the network architecture 200. In addition, trace manager 342 may monitor operations performed by offered services. In one embodiment, trace manager 342 captures trace data that can be used to identify software defects or perform an operational assessment. For example, code traces can assist in identifying performance bottlenecks, edge case errors, and other hard-to-detect issues. A code trace can identify which services are invoked by a particular service, along with associated metadata such as parameters, timestamps, results, and so on. The trace data may represent the live execution of a distributed application 110 and may document a plurality of calls to a plurality of component services of the distributed application 110. In one embodiment, trace manager 342 stores the captured traces as trace data 372 in data store 262.

In one embodiment, capture agent interface 344 manages communication with debugging agents 256, 258 resident on each of host machines 210A-210B (e.g., as part of distributed applications 110A-110B). Capture agent interface 344 may receive information from agents 256, 258 including captured inputs received by application 110 during live execution. In one embodiment, captured inputs may include responses (e.g., values, variables) to calls made to a plurality of component services of the distributed application 110 during live execution. For example, an input may include the result of a database query, a cache lookup, status, header and body of an HTTP request, etc. In other embodiments, inputs include an indication of a request or event that trigger the handler code, the success codes of output operations (e.g., error numbers or exceptions, a result of non-deterministic language runtime and operating system calls (e.g., get system time, generate random number), concurrency related sources of non-determinism, all information read from global variables, etc. In one embodiment, capture agent interface 344 stores the captured inputs as input data 374 in data store 262.

In one embodiment, replay execution manager 346 controls a replay execution of the distributed application 110 in a debugging environment 150. In one embodiment, the debugging environment 150 is off-line and completely separate from production environment 100. Replay execution manager 246 may receive a request from a user to perform the replay execution, and in response may initiate the replay execution of application 110 in debugging environment 150. During the replay execution, the application 110 may make calls to a plurality of component services of the distributed application. These calls may be identified in the replay execution from trace data 372. Replay execution manager 346 can detect those calls and can apply a corresponding one of the inputs stored in input data to the distributed application during the replay execution. As a result, the replay execution of application 110 in debugging environment 150 mirrors the live execution of application 110 in production environment 100.

In one embodiment, debugging manager 348 performs debugging of the distributed application 110 during the replay execution in debugging environment 150. Since the replay execution manager 346 uses inputs stored in input data 374, and does not rely on inputs from other microservices, the debugging can be performed using any debugging tools that are available. Debugging manager 348 can pause and step through the replay execution of application 110 without any impact on the live execution in production environment 100. In one embodiment, debugging manager 348 receives a debugging configuration selection from a user and performs the debugging of the distributed application 110 in the debugging environment according to the debugging configuration selection. The debugging configuration selection may include, for example, (1) breakpoint live services without service impact and not requiring redeployment, (2) ad-hoc search and replay of past requests, or (3) an option for single step, watch, and breakpoint requests.

Figure 4:
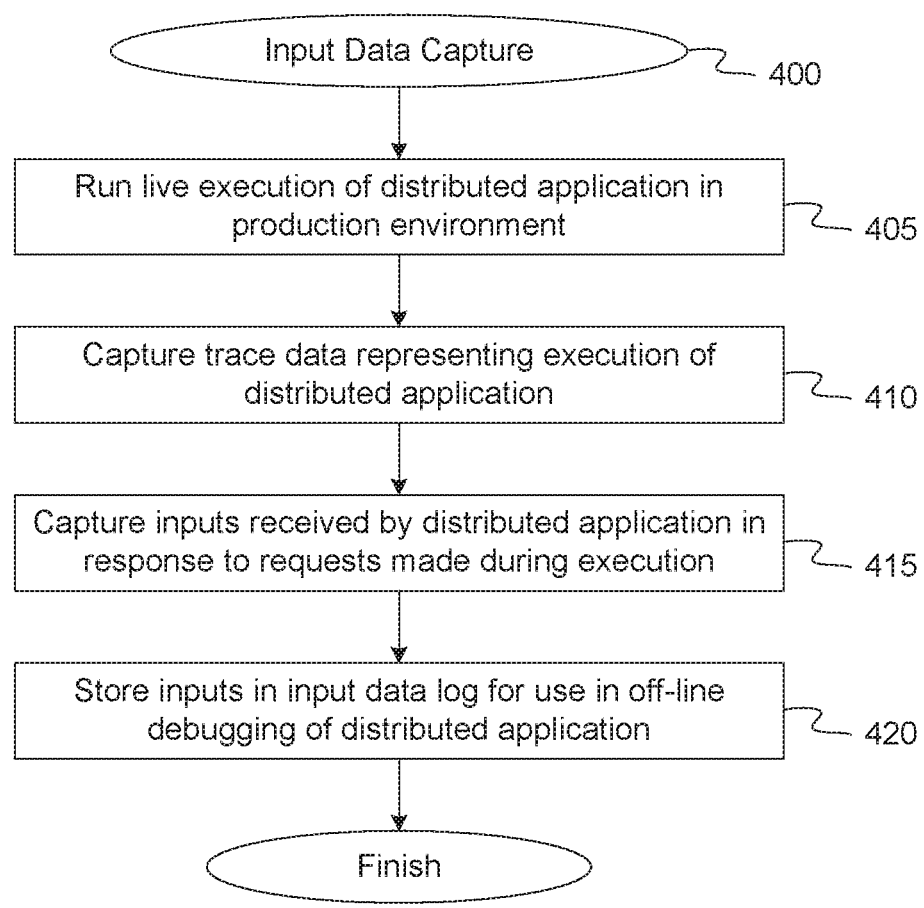
FIG. 4 is a flow diagram illustrating a method of input data capture during live execution of a distributed application, according to an embodiment.

FIG. 4 is a flow diagram illustrating a method of input data capture during live execution of a distributed application, according to an embodiment. The method 400 may be performed by processing logic that comprises hardware (e.g., circuitry, dedicated logic, programmable logic, microcode, etc.), software, firmware, or a combination thereof. The processing logic is configured to capture one or more inputs to a distributed application during live execution of the distributed application in a production environment. In one embodiment, method 400 may be performed by debugger core 270, as shown in FIGS. 2 and 3.

Referring to FIG. 4, at block 405, method 400 initiates the live execution of the distributed application in the production environment. In one embodiment, one of distributed applications 110A-110B may run on a corresponding one of host machines 210A-210B, which make up a cloud computing cluster. At the request of a user of one of client devices 205A-205N, the distributed application 110 may begin execution in production environment 100. The distributed application 110 may perform any series of tasks using the resources available from host machines 210A-210B.

At block 410, method 400 captures trace data representing the live execution of the distributed application. In one embodiment, during the live execution, the distributed application 110 may make one or more calls to a plurality of component services. The calls can include any request for information, such as a query to read data from a database, a lookup operation performed on a data store, an HTTPS request, and API call to another service or application, etc. In one embodiment, trace manager 342 captures trace data that can be used to identify software defects or perform an operational assessment. For example, code traces can assist in identifying performance bottlenecks, edge case errors, and other hard-to-detect issues. A code trace can identify which services are invoked by a particular service, along with associated metadata such as parameters, timestamps, results, and so on. The trace data may represent the live execution of a distributed application 110 and may document a plurality of calls to a plurality of component services of the distributed application 110. In one embodiment, trace manager 342 stores the captured traces as trace data 372 in data store 262.

At block 415, method 400 captures one or more inputs received by the distributed application during the live execution in the production environment. In one embodiment, capture agent interface 344 may receive information from agents 256, 258 including captured inputs received by application 110 during live execution. In one embodiment, captured inputs may include responses (e.g., values, variables) to calls made to a plurality of component services of the distributed application 110 during live execution. For example, an input may include the result of a database query, a cache lookup, status, header and body of an HTTP request, etc. In other embodiments, inputs include an indication of a request or event that trigger the handler code, the success codes of output operations (e.g., error numbers or exceptions, a result of non-deterministic language runtime and operating system calls (e.g., get system time, generate random number), concurrency related sources of non-determinism, all information read from global variables, etc. At block 420, method 400 stores an indication of the one or more inputs to the distributed application as input data 373 in a networked data store 262 accessible from the debugging environment 150.

Figure 5:
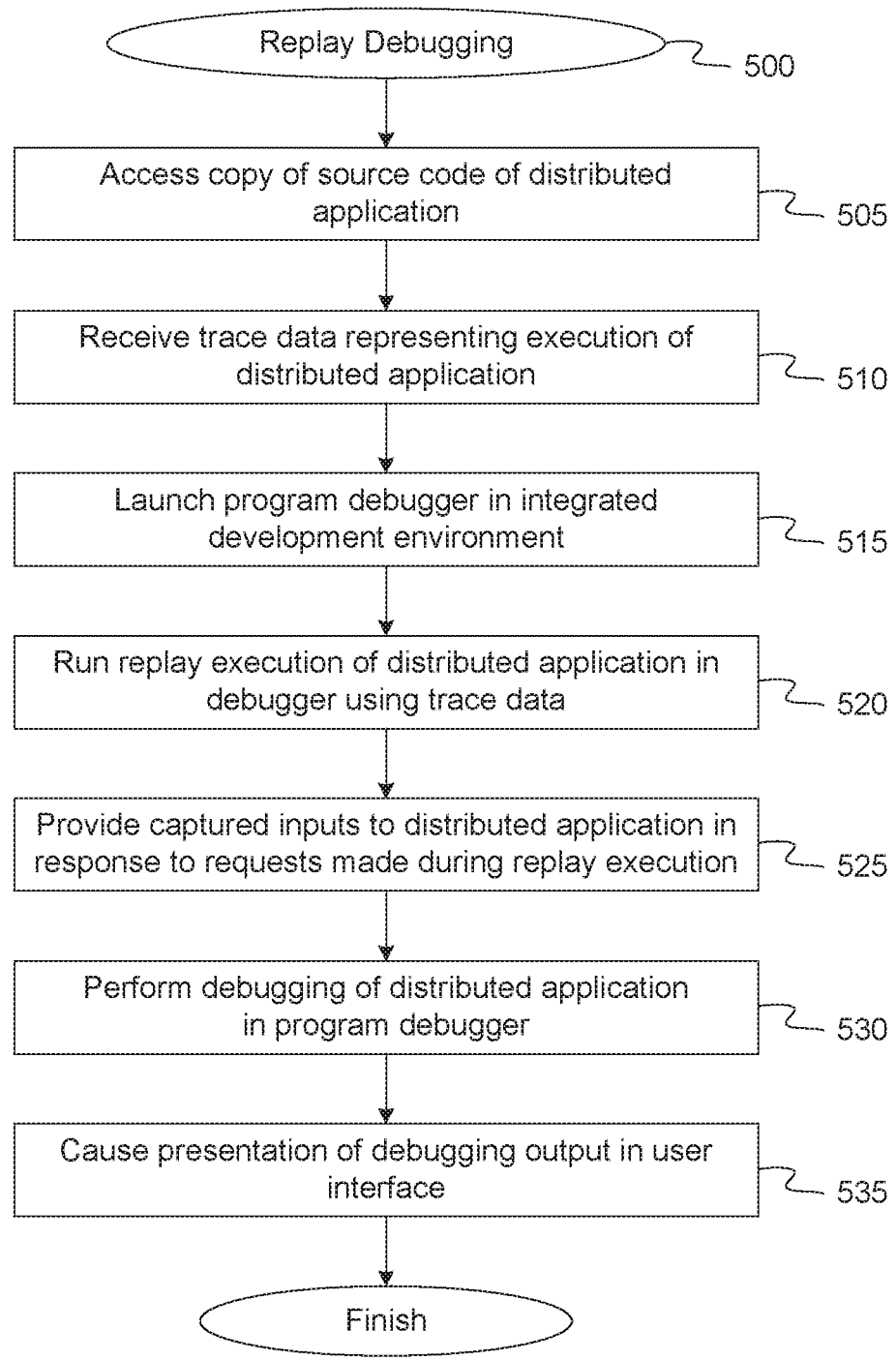
FIG. 5 is a flow diagram illustrating a method of microservice replay debugging, according to an embodiment.

FIG. 5 is a flow diagram illustrating method of microservice replay debugging, according to an embodiment. The method 500 may be performed by processing logic that comprises hardware (e.g., circuitry, dedicated logic, programmable logic, microcode, etc.), software, firmware, or a combination thereof. The processing logic is configured to apply one or more captured inputs to the distributed application during replay execution of the distributed application in a debugging environment, to allow offline debugging of the distributed application. In one embodiment, method 500 may be performed by debugger core 270, as shown in FIGS. 2 and 3.

Figure 6:
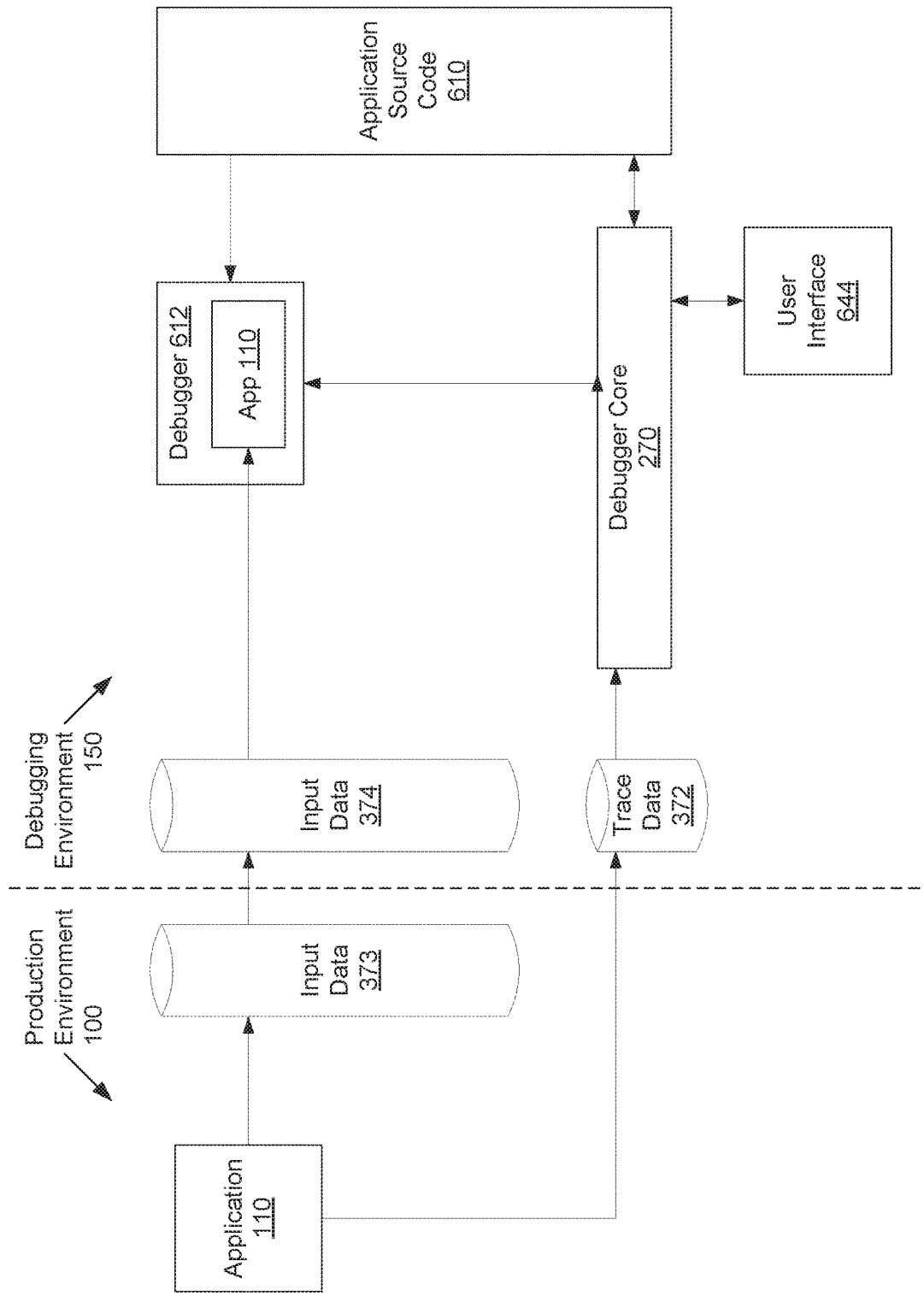
FIGS. 6 and 7 are diagrams illustrating computing environments associated with microservice replay debugging, according to an embodiment.
Figure 7:
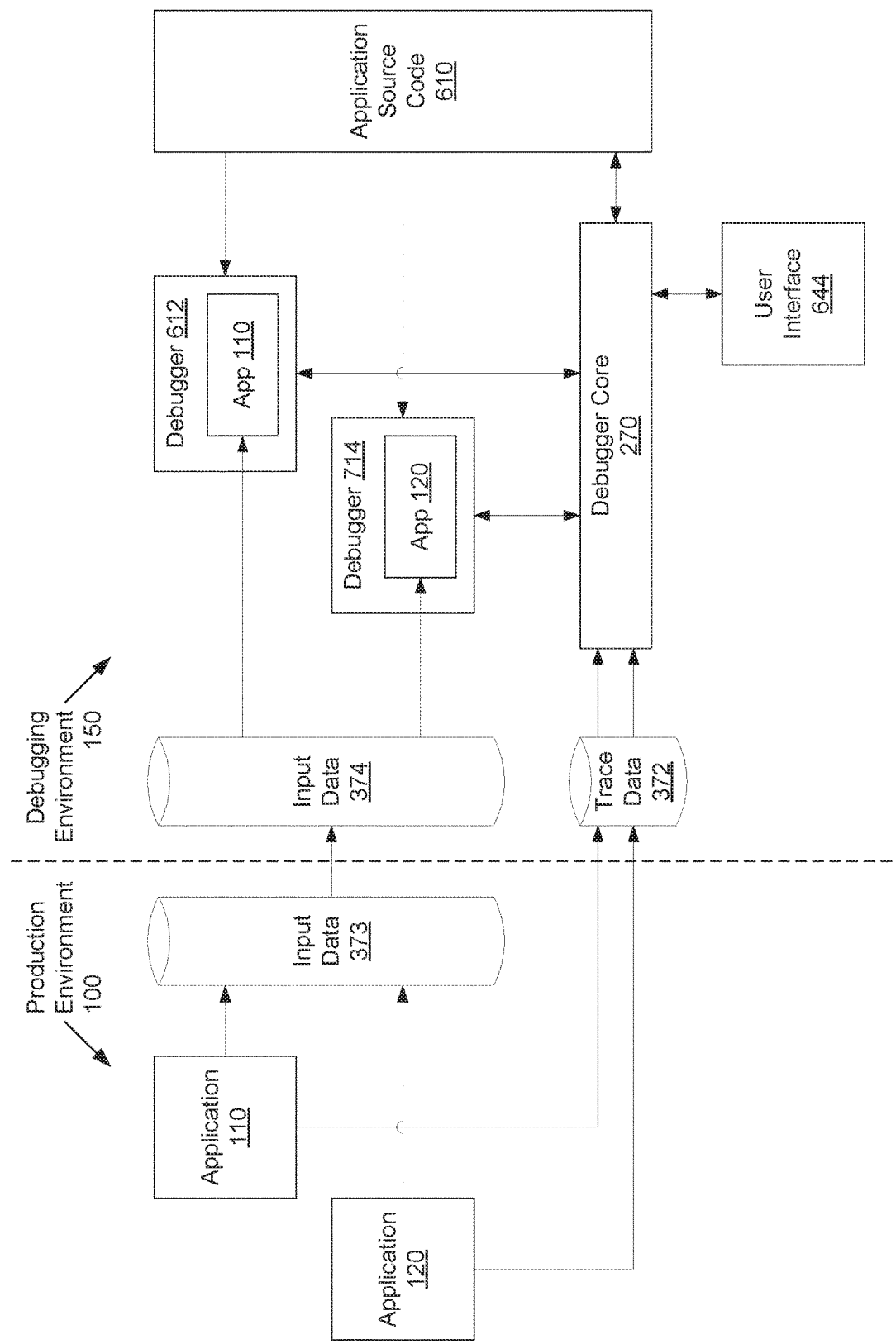

Referring to FIG. 5, at block 505, method 500 accesses a copy of the source code of the distributed application 110. As shown in FIG. 6, in one embodiment, a copy of application source code 610 may be available in debugging environment 150. The application source code 610 may be stored on a local data store of a computing device where debugging will be performed or may be accessible from some other network connected data store. In one embodiment, application source code 610 includes the computer instructions associated with performing any actions specified for distributed application 110.

At block 510, method 500 receives trace data 372 representing the live execution of the distributed application 110. The trace data 372 may represent the live execution of distributed application 110 and may document a plurality of calls to a plurality of component services of the distributed application 110. Debugger core 270 can use the trace data 372 to reconstruct the processing flow of application 110 using instructions from application source code 610, for the replay execution in debugging environment 150 in order to mirror the previous live execution in production environment 100.

At block 515, method 500 receives a debugging configuration selection from a user of the debugging environment 150 and launches a program debugger 612 in an integrated development environment according to the debugging configuration selection. In one embodiment, debugging manager 348 of debugger core 270 receives the debugging configuration selection. The debugging configuration selection may include, for example, (1) breakpoint live services, (2) ad-hoc search and replay of past requests, or (3) an option for single step, watch, and breakpoint requests. Based on the debugging configuration selection, debugger core may launch program debugger 612 to allow debugging of distributed application 110 in a traditional debugging environment (e.g. gdb), while allowing users to leverage decades of core technology and use tools with which they are already familiar within their developer workflows.

At block 520, method 500 initiates the replay execution of the distributed application 110 in the debugging environment 150 and runs the replay execution of the distributed application using trace data 372 captured during the live execution of the distributed application 110. In one embodiment, replay execution manager 246 of debugger core 270 may receive a request from a user to perform the replay execution, and in response may initiate the replay execution of application 110 in debugging environment 150. In general, the replay execution of distributed application 110 in the debugging environment 150 may occur after a live execution of distributed application 110 in the production environment 100 has completed. In other embodiments, however, the replay execution may occur before, during or after the live execution of distributed application 110.

At block 525, method 500 receives calls to a plurality of component services of the distributed application 110 during the replay execution of the distributed application 110 and provides the captured inputs from input data 274 to the distributed application 110 during the replay execution in response to the calls. During the replay execution, the application 110 may make calls to a plurality of component services of the distributed application 110. These calls may be identified in the replay execution from trace data 372. Replay execution manager 346 can detect those calls and can instruct debugger 612 110 to request a corresponding one of the inputs stored in input data 374 for the distributed application 110 during the replay execution. In one embodiment, the calls are uniquely identified in trace data 372 by using a unique trace identifier value associated with each call. When a response to that call is captured and stored in input data 373, 374, the corresponding unique trace identifier is also stored with the response to associated the response with the corresponding call. To identify the input to be applied to a certain call during replay execution, replay execution manager 346 instructs debugger 612 to request the input stored with a particular trace identifier value from input data 374.

At block 530, method 500 performs the debugging of the distributed application in the debugging environment. In one embodiment, debugging manager 348 of debugger core performs debugging of the distributed application 110 during the replay execution in debugging environment 150. Since the replay execution manager 346 uses inputs stored in input data 374, which were copied from input data 373 captured in production environment 100, and does not rely on inputs from other microservices, the debugging can be performed using any debugging tools that are available. Debugging manager 348 can pause and step through the replay execution of application 110 without any impact on the live execution in production environment 100.

At block 535, method 500 causes presentation of a debugging output in a user interface 644, as shown in FIG. 6.

As described above, FIG. 6 is a diagram illustrating computing environments associated with microservice replay debugging, according to an embodiment. In FIG. 6, a single program debugger 612 is executed in debugging environment 150 to debug a first distributed application 110. In an alternative embodiment illustrated in FIG. 7, multiple program debuggers 612, 714 may be executed concurrently in debugging environment 150 to debug multiple distributed applications 110, 120. In one embodiment, program debuggers 612 and 714 can be different debugging tools. Debugger 714 and debugger core 270 can utilize application source code 610, trace data 372 and input data 374 corresponding to application 120 in order to perform replay execution and debugging of application 120 in debugging environment 150. In one embodiment, the multiple program debuggers 612 and 714 can be used to debug multiple instances of the same application 110 concurrently.

Figure 8:
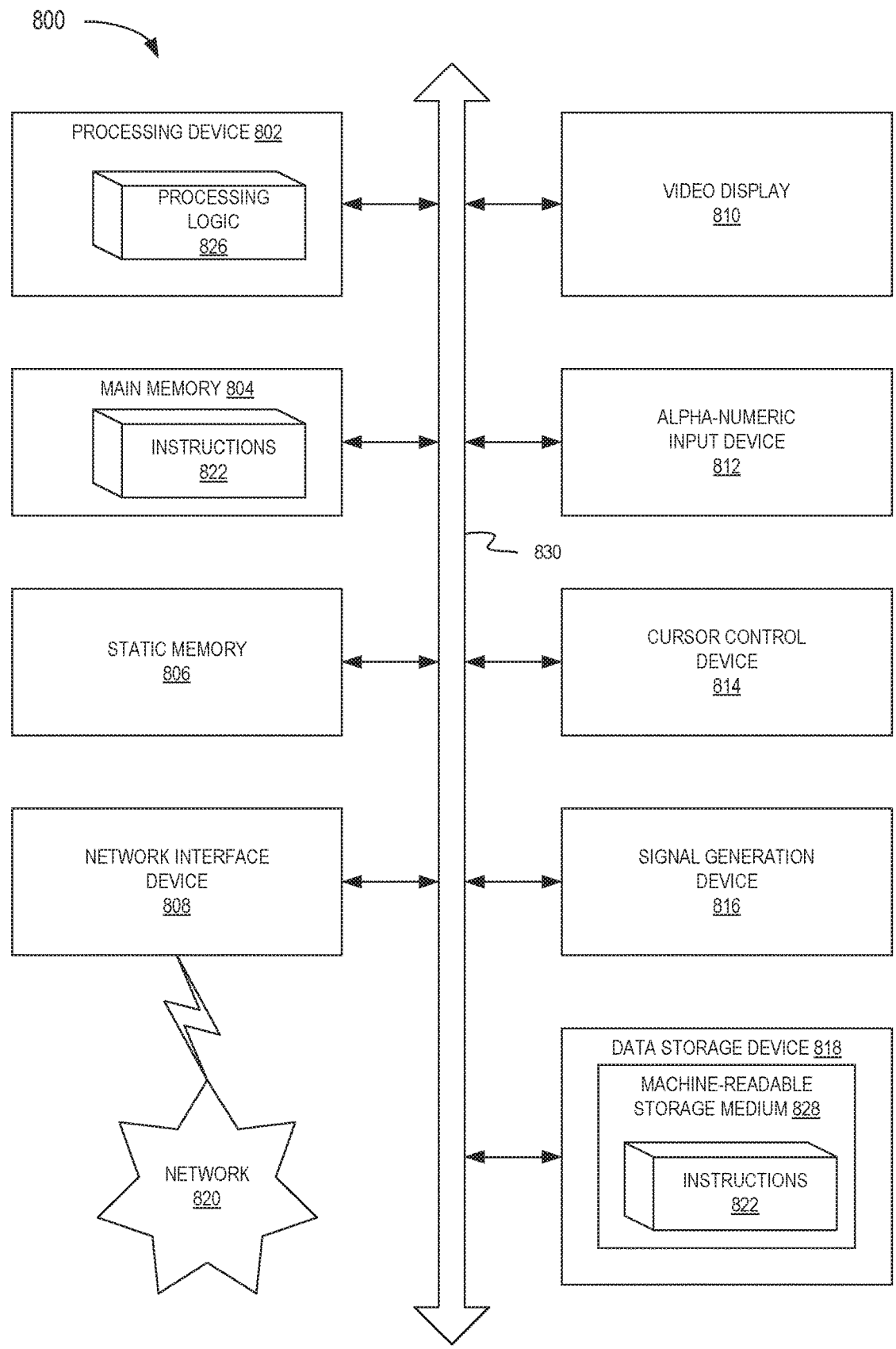
FIG. 8 is a block diagram illustrating one embodiment of a computer system, according to an embodiment.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a host machine, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a computing device, such as host machines 210A-210B, Debugger Core 270 or client devices 205A-205N.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium 828, on which is stored one or more set of instructions 822 (e.g., software) embodying any one or more of the methodologies of functions described herein. The instructions 822 may also reside, completely or at least partially, within the main memory 804 and/or within the processing device 802 during execution thereof by the computer system 800; the main memory 804 and the processing device 802 also constituting machine-accessible storage media. The instructions 822 may further be transmitted or received over a network 820 via the network interface device 808.

The machine-readable storage medium 828 may also be used to store instructions for a micro-service replay debugger, as described herein. While the machine-readable storage medium 828 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage media (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

capturing one or more inputs to a distributed application during live execution of the distributed application in a production environment, wherein the one or more inputs to the distributed application comprise responses to a plurality of calls to a plurality of component services of the distributed application, and wherein each of the plurality of calls is identified by a unique trace identifier;

applying, by one or more processors, the one or more inputs to the distributed application in response to the plurality of calls made during replay execution of the distributed application in a debugging environment, wherein each of the one or more inputs is identified by the unique trace identifier corresponding to an associated one of the plurality of calls; and performing debugging of the distributed application in the debugging environment.

2. The method of claim 1, further comprising:

initiating the live execution of the distributed application in the production environment; and capturing trace data representing the live execution of the distributed application, the trace data documenting the plurality of calls to the plurality of component services of the distributed application.

3. The method of claim 1, further comprising:

storing an indication of the one or more inputs to the distributed application in a networked data store accessible from the debugging environment.

4. The method of claim 1, further comprising:

initiating the replay execution of the distributed application in the debugging environment after the live execution is complete; and running the replay execution of the distributed application using trace data captured during the live execution of the distributed application.

5. The method of claim 1, further comprising:

receiving calls to the plurality of component services of the distributed application during the replay execution of the distributed application; and applying the one or more inputs to the distributed application during the replay execution in response to the calls.

6. The method of claim 1, further comprising:

receiving a debugging configuration selection from a user of the debugging environment; and performing the debugging of the distributed application in the debugging environment according to the debugging configuration selection.

7. A system comprising:

one or more processors; and memory to store computer-executable instructions that, if executed, cause the one or more processors to:

receive one or more inputs to a distributed application to be used with a first performance of the distributed application in a first environment, wherein the one or more inputs to the distributed application comprise responses to a plurality of calls to a plurality of component services of the distributed application, and wherein each of the plurality of calls is identified by a unique trace identifier;

send the one or more inputs to the distributed application in response to the plurality of calls made during a second performance of the distributed application in a second environment, wherein each of the one or more inputs is identified by the unique trace identifier corresponding to an associated one of the plurality of calls; and perform debugging of the distributed application in the second environment.

8. The system of claim 7, wherein the computer-executable instructions further cause the one or more processors to:

initiate the first performance of the distributed application in the first environment; and receive trace data representing the first performance of the distributed application, the trace data documenting the plurality of calls to the plurality of component services of the distributed application.

9. The system of claim 7, wherein the computer-executable instructions further cause the one or more processors to:

store an indication of the one or more inputs to the distributed application in a networked data store accessible from the second environment.

10. The system of claim 7, wherein the computer-executable instructions further cause the one or more processors to:

initiate the second performance of the distributed application in the second environment; and run the second performance of the distributed application using trace data captured during the first performance of the distributed application.

11. The system of claim 7, wherein the computer-executable instructions further cause the one or more processors to:

receive calls to the plurality of component services of the distributed application during the second performance of the distributed application; and send the one or more inputs to the distributed application during the second performance in response to the calls.

12. The system of claim 7, wherein the computer-executable instructions further cause the one or more processors to:

receive a debugging configuration selection from a user of the second environment; and perform the debugging of the distributed application in the second environment according to the debugging configuration selection.

13. One or more non-transitory machine-readable media having stored thereon one or more instructions, which if performed by one or more processors, cause the one or more processors to at least:

capture one or more values received by a distributed application during execution of the distributed application in a runtime environment, wherein the one or more values received by the distributed application comprise responses to a plurality of calls to a plurality of component services of the distributed application, and wherein each of the plurality of calls is identified by a unique trace identifier; and replay the execution of the distributed application in a debugging environment by providing the one or more values to the distributed application in response to the plurality of calls made by the distributed application during the replay of the execution, wherein each of the one or more values is identified by the unique trace identifier corresponding to an associated one of the plurality of calls.

14. The one or more non-transitory machine-readable media of claim 13, wherein the one or more instructions further cause the one or more processors to:

initiate the execution of the distributed application in the runtime environment; and receive trace data representing the execution of the distributed application in the runtime environment, the trace data documenting the plurality of calls to the plurality of component services of the distributed application.

15. The one or more non-transitory machine-readable media of claim 13, wherein the one or more instructions further cause the one or more processors to:
store an indication of the one or more values received by the distributed application in a networked data store accessible from the debugging environment.

16. The one or more non-transitory machine-readable media of claim 13, wherein the one or more instructions further cause the one or more processors to:
initiate the replay of the execution of the distributed application in the debugging environment; and
run the replay of the execution of the distributed application in the debugging environment using trace data captured during the execution of the distributed application in the runtime environment.

17. The one or more non-transitory machine-readable media of claim 13, wherein the one or more instructions further cause the one or more processors to:
receive calls to the plurality of component services of the distributed application during the execution of the distributed application in the debugging environment; and
send the one or more values to the distributed application during the replay of the execution of the distributed application in response to the calls.

* * * * *